United States Patent [19]

Usuki et al.

[11] Patent Number: 5,380,784
[45] Date of Patent: Jan. 10, 1995

[54] WATER-BASED RESIN DISPERSION AND RESIN COMPOSITION FOR COATING

[75] Inventors: Kazuhiko Usuki, Osaka; Kazuhiko Nishimoto, Saitama; Akio Tokuyama, Osaka; Koichi Saito, Kyoto; Manabu Yoshioka, Osaka, all of Japan

[73] Assignee: Nippon Paint Co., Ltd., Osaka, Japan

[21] Appl. No.: 836,906

[22] Filed: Feb. 19, 1992

[30] Foreign Application Priority Data

Feb. 27, 1991 [JP] Japan .................... 3-033133

[51] Int. Cl.$^6$ ............................................. C08K 3/10
[52] U.S. Cl. .................................... 524/407; 524/558; 524/818
[58] Field of Search .................... 524/818, 407, 558

[56] References Cited

U.S. PATENT DOCUMENTS

| 3,644,316 | 2/1972 | Marx et al. ................... 260/85.5 |
| 4,250,070 | 2/1981 | Ley et al. ..................... 524/818 X |
| 4,296,226 | 10/1981 | Braun et al. ................. 524/818 X |
| 4,503,099 | 3/1985 | Chang et al. ................. 524/407 X |
| 4,906,684 | 3/1990 | Say ................................. 524/548 |
| 5,070,136 | 12/1991 | Dersch et al. ............... 524/818 X |
| 5,102,936 | 4/1992 | Huth et al. ................... 524/555 X |

FOREIGN PATENT DOCUMENTS

| 0022545 | 1/1981 | European Pat. Off. ............ 524/818 |
| 137199 | 4/1985 | European Pat. Off. . |
| 1644990 | 7/1971 | Germany . |
| 7608630 | 2/1977 | Netherlands ......................... 524/818 |

OTHER PUBLICATIONS

Chemical Abstract No. 114: 248010q Jul. 1, 1991.

Primary Examiner—Judy M. Reddick
Attorney, Agent, or Firm—Lowe, Price, LeBlanc & Becker

[57] ABSTRACT

The invention relates to formation of a resin film excellent in adhesion with metal or other material and also excellent in alkaline resistance. The invention presents a water-based resin dispersion having an acid value of 0 to 15 obtained by emulsion polymerization of a monomer mixture comprising, in 100 parts by weight of $\alpha,\beta$-ethylenically unsaturated monomer, (1) 1 to 20 parts by weight of $\alpha,\beta$-ethylenically unsaturated monomer with a $\beta$-ketoester group, (2) 0.05 to 5 parts by weight of crosslinking $\alpha,\beta$-ethylenically unsaturated monomer with two or more radically polymerizable groups, and (3) the rest of other $\alpha,\beta$-ethylenically unsaturated monomer than (1) and (2), by using a radically polymerizable emulsifier at a ratio of 0.2 to 10 parts by weight against the total of 100 pats by weight of the $\alpha,\beta$-ethylenically unsaturated monomer.

8 Claims, No Drawings

WATER-BASED RESIN DISPERSION AND RESIN COMPOSITION FOR COATING

BACKGROUND OF THE INVENTION

The present invention relates to a new kind of water-based resin dispersion which can be used to form film excellent in adhesion to metal surface or the like and also excellent in alkaline resistance, and relates to a resin composition for coating comprising such water-based resin dispersion as an effective ingredient.

The aluminum-zinc alloyed layer generally contains 4 to 75 wt. % of aluminum on aluminum-zinc alloyed steel plate. The balance is zinc, or zinc and trace elements added as required such as Si, Mg and Ce-La. The properties of aluminum-zinc alloyed steel plate such as corrosion resistance, heat resistance, and heat reflectivity are superior to those of galvanized steel or the like. Accordingly, the aluminum-zinc alloyed steel plate are used in various applications such as roofing material, wall material and other building materials, sink and kitchen facilities and others.

In the aluminum zinc alloyed steel plate, since aluminum is contained in the plating layer, aluminum is easily corroded when contacting with an alkaline solution, and it turns dark (the so-called darkening phenomenon occurs). When such phenomenon occurs, the appearance is extremely spoiled. Therefore, it has been required to develop a treatment process in order to prevent the darkening phenomenon even if the aluminum-zinc alloyed steel plate contacts with the alkaline solution.

Incidentally, the art of coating and treating an aluminum-zinc alloyed steel plate with a resin composition was proposed, for example, in the Japanese Official Patent Provisional Publication No. 60-197881. But this art is intended to form a film which is excellent in lubricity and corrosion resistance and is usable as an undercoat for painting, on the surface of the aluminum-zinc alloyed steel plate, and is not designed to prevent darkening due to contact with alkaline solution.

SUMMARY OF THE INVENTION

It is hence a primary object of the invention to present a new type of water-based resin dispersion capable of forming a film which is excellent in adhesion to metal or the like and also excellent in alkaline resistance. It is a second object of the invention to present a resin composition for coating capable of improving the alkaline resistance of aluminum-zinc alloyed steel plate or the like.

The present inventors considered to form a resin film excellent in alkali resistance to metal or the like in order to prevent darkening due to contact with alkaline solution, and studied on the resin suitable for this purpose. In this investigation, considering the size of the facility and working efficiency, an original target was set, that was, the resin film should be formed by drying at low temperature and in a short period (for example, the metal temperature: 100° C. or lower).

As a result, in order to form a film excellent in alkaline resistance by drying at low temperature and in a short period, it was found important to lower the acid value of the resin, and to polymerize the resin as much as possible to the extent not to spoil the film forming property of the resin particles. On the other hand, the polyester emulsion resin and alkyd emulsion resin are inferior in alkaline resistance, the epoxy emulsion resin is inferior in weatherability, but the acrylic emulsion resin is excellent in alkaline resistance and also in weather-ability. It was accordingly studied to use an acrylic emulsion resin which was lowered in the resin acid value. If merely the acid value is lowered, however, the acrylic emulsion resin is worsened in the adhesion. As a result of further studies, a monomer capable of endowing with an adhesion was found, and it was found favorable to use a new acrylic emulsion resin using this monomer. Furthermore, by formulating chromic acid, it was found that the alkaline resistance was still more enhanced. The invention was completed on the basis of such findings.

To achieve the first object mentioned above, the invention presents a water-based dispersion having an acid value of 0 to 15 which is obtained by emulsion polymerization of a monomer mixture comprising, in 100 parts by weight of α,β-ethylenically unsaturated monomers, (1) 1 to 20 parts by weight of α,β-ethylenically unsaturated monomer with a β-ketoester group, (2) 0.05 to 5 parts by weight of crosslinking α,β-ethylenically unsaturated monomer with two or more radically polymerizable groups, and (3) the rest of other α,β-ethylenically unsaturated monomer than (1) and (2), by using a radically polymerizable emulsifier (hereinafter, there is a case this is referred to as "reactive emulsifier") at a ratio of 0.2 to 10 parts by weight against the total of 100 parts by weight of the α,β-ethylenically unsaturated monomers.

To achieve the second object, the invention presents a resin composition for coating containing the above specific water-based resin dispersion. This resin composition for coating comprises chromium (VI) ions where the ratio by weight to the resin-solid is between 1/1000 and 1/10.

The water-based resin dispersion of the invention is obtained by emulsion polymerization of a monomer mixture containing the above monomers (1), (2) and (3) at a specific composition by using said reactive emulsifier.

The monomer (1) used in the invention, that is, the α,β-ethylenically unsaturated monomer with a β-ketoester group is, for example, 2-acetoacetoxyethylmethacrylate (hereinafter, there is a case this is referred to as AAEM) as shown below in formula 1, allyl acetoacetate as shown in formula 2, etc., and one monomer may be used alone, or two or more monomers may be used in combination. The β-ketoester group is shown in formula 3.

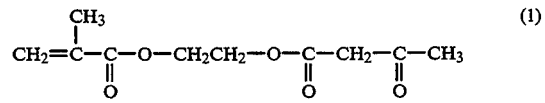

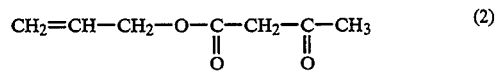

In the invention, the monomer (2), that is, the crosslinking α,β-ethylenically unsaturated monomer having two or more radically polymerizable groups is, for example, a monomer having two or more radically polymerizable unsaturated groups, which may be used either alone or in combination of two or more. The monomer containing two or more radically polymerizable unsaturated groups includes, for example, the following compounds:

Ethylene glycol diacrylate, ethylene glycol dimethacrylate, triethylene glycol dimethacrylate, tetraethylene glycol dimethacrylate, 1,3-butylene, glycol dimethacrylate, trimethylol propane triacrylate, trimethylol propane methacrylate, 1,4-butanediol diacrylate, 1,4-butanediol dimethacrylate, neopentyl glycol diacrylate, neopentyl glycol dimethacrylate, 1,6-hexanediol diacrylate, 1,6-hexanediol dimethacrylate, pentaerythritol diacrylate, pentaerythritol dimethacrylate, glycerin diacrylate, glycerin dimethacrylate, allyl acrylate, allyl methacrylate, diallyl phthalate, divinyl benzene, etc.

In the invention, the monomer (3), that is, the $\alpha,\beta$-ethylenically unsaturated monomer other than the monomers (1) and (2) is, for example, the compounds (4) to (13) listed below. These may be used alone or in combination of two or more.

(4) Alkyl esters of acrylic acid and methacrylic acid:
Methyl acrylate, methyl methacrylate, ethyl acrylate, ethyl methacrylate, n-butyl acrylate, n-butyl methacrylate, i-butyl acrylate, i-butyl methacrylate, t-butyl methacrylate, 2-ethyl hexyl acrylate, 2-ethyl hexyl methacrylate, lauryl methacrylate, phenyl acrylate, etc.

(5) Aromatic monovinyl compounds:
Styrene, a-methyl styrene, t-butyl styrene, p-chlorostyrene, chloromethyl styrene, etc.

(6) Nitriles:
Acrylonitrile, methacrylonitriles, etc.

(7) Vinyl derivatives:
Vinyl acetate, vinyl propionate, etc.

(8) Dienes:
Butadiene, isoprene, etc.

(9) Acrylamide, methacrylamide, and their derivatives:
Acrylamide, methacrylamide, N-methyl acrylamide, N,N-dimethyl acrylamide, N-methylol acrylamide, N-methoxy methylacrylamide, N-butoxy methyl acrylamide, N,N-dimethyl aminopropyl methacrylamide, etc.

(10) Monovinyl monomer containing carboxyl group:
Acrylic acid, methacrylic acid, itaconic acid, crotonic acid, maleic acid, fumaric acid, 5-carboxy pentyl acrylate, etc.

(11) Amino alkyl esters of acrylic acid and methacrylic acid:
N,N-dimethyl aminoethyl acrylate, N,N-dimethyl aminoethyl methacrylate, N,N-dimethyl aminopropyl acrylate, N,N-dimethyl aminopropyl methacrylate, etc.

(12) Monovinyl monomers containing hydroxyl group:
2-Hydroxyethyl acrylate, 2-hydroxyethyl methacrylate, hydroxy propyl acrylate, hydroxy propyl methacrylate, hydroxy butyl acrylate, hydroxy butyl methacrylate, allyl alcohol, etc.

(13) Monovinyl monomers containing alkoxy silyl group:
Vinyl trimethoxy silane, vinyl triethoxy silane, $\gamma$-methacryloxy propyl methoxy silane, etc.

The reactive emulsifier used in the invention is not particularly limited, as far as it is a radically polymerizable compound, being an emulsifier of anionic type, nonionic type, or anionic-nonionic type. For example, the following emulsifiers having radically polymerizable groups such as (meth) acrylic group, (meth) allyl group and styryl group, may be used either alone or in combination of two or more.

(A) Anionic type of reactive emulsifier (containing acid group such as sulfate group, sulfonate group, phosphate group and carboxyl group)
Typical examples include the following.
(a) Reactive emulsifier in a sulfosuccinic ester series, shown in formula 4

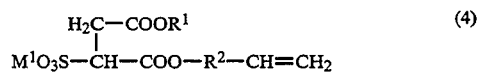

[where $R^1$ is alkyl group, alkenyl group, aryl group or aralkyl group with 6 to 18 carbon atoms;

$R^2$ is $-CH_2-$ or $-CH_2-\underset{OH}{CH}-CH_2O-$; and $M^1$ is alkali metal, ammonium, or organic ammonium]
(b) Reactive emulsifier in a phosphate diester series, shown in formula 5

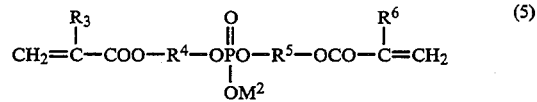

where each of $R^3$ and $R^6$, which may be the same or different, is H or $CH_3$;
each of $R^4$ and $R^5$, which may be the same or different, is alkyl group, alkenyl group, aryl group, or aralkyl group with 6 to 18 carbon atoms; and
$M^2$ is alkali metal, ammonium, or organic ammonium]
(B) Nonionic type of reactive emulsifier
Typical examples include the following.
(a) Reactive emulsifier in a polyoxy ethylene phenyl ether series, shown formulae 6 to 8

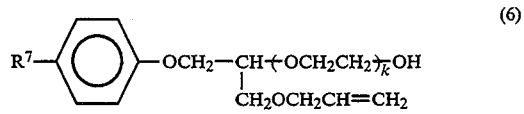

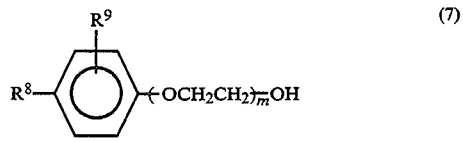

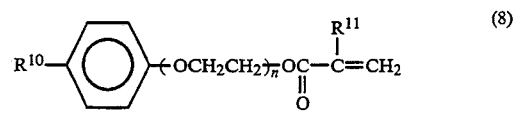

(where, in formulae 6, 7, and 8,
each of $R^7$, $R^8$, and $R^{10}$, which may be the same or different, is alkyl group, alkenyl group, aryl group, or aralkyl group with 6 to 18 carbon atoms;
$R^9$ is allyl or crotonyl group;

$R^{11}$ is H or $CH_3$; and each of k, m and n, which may be the same or different, is a number from 1 to 50]

(b) Reactive emulsifier in a polyoxy propylene polyoxy ethylene ether ester series, shown in formula 9

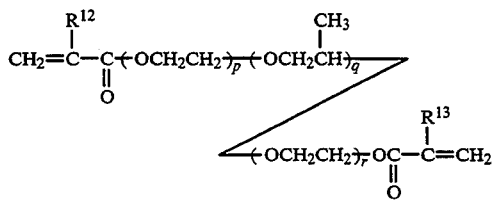

(9)

where each of $R^{12}$ and $R^{13}$, which may be the same or different, is H or $CH_3$;

p is a number from 10 to 50;

q is a number from 1 to 50; and r is a number from 1 to 50]

(C) Nonionic-anionic type of reactive emulsifier (a) Reactive emulsifier in a polyoxy ethylene phenyl ether sulfate series, shown in formulae 10 to 12

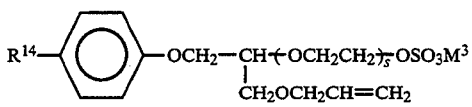

(10)

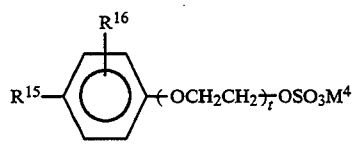

(11)

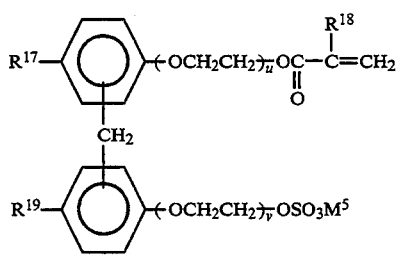

(12)

where, in formulae 10, 11, and 12, each of $R^{14}$, $R^{15}$, $R^{17}$ and $R^{19}$, which may be the same or different, is alkyl group, alkenyl group, aryl group, or aralkyl group with 6 to 18 carbon atoms;

$R^{16}$ is allyl or crotonyl group;

$R^{18}$ is H or $CH_3$;

each of $M^3$, $M^4$, and $M^5$, which may be the same or different, is alkali metal, ammonium, or organic ammonium; and each of s, t, u, and v, which may be the same or different, is a number from 1 to 50]

It is necessary that the ratio of the reactive emulsifier and α,β-ethylenically unsaturated monomer is, against the total of 100 parts by weight of the monomers (1), (2) and (3), in a range of:

reactive emulsifier 0.2 to 10 parts by weight,
monomer (1) 1 to 20 parts by weight,
monomer (2) 0.05 to 5 parts by weight, and
monomer (3) 75 to 98.5 parts by weight.

If the ratio of the reactive emulsifier is lower than in the range specified above, the stability of emulsion in polymerization is poor, and agglutination occurs, or if higher, a film with lower alkaline resistance is formed. If the ratio of the monomer (1) is lower than in the range specified above, a film with lower adhesion is formed, or if higher, a film with lower alkaline resistance is formed. If the ratio of the monomer (2) is lower than in the range specified above, a film with lower alkaline resistance is formed, or if higher, the capability of forming a film is lowered.

The ratio of the reactive emulsifier and α,β-ethylenically unsaturated monomer is, preferably, against the total of 100 parts by weight of the monomers (1), (2) and (3), in a range of:

reactive emulsifier 0.5 to 5 parts by weight,
monomer (1) 3 to 15 parts by weight,
monomer (2) 0.1 to 3 parts by weight, and
monomer (3) 82 to 96.9 parts by weight.

The emulsion polymerization of α,β-ethylenically unsaturated monomer using the reactive emulsifier is performed, for example, as follows. To a pre-emulsion composed of the reactive emulsifier, monomers and water, a polymerization initiator is added, for example, at a ratio of 0.1 to 2 parts by weight to 100 parts by weight of monomers, and reaction is conducted for 1 to 12 hours in water at a temperature of 40° to 95° C. As the polymerization initiator, persulfate such as potassium persulfate and ammonium persulfate, and azo compounds such as 4,4'-azobiscyanovaleric acid may be used. The redox system, where a reductive agent such as sodium hydrogensulfate is used as a accelerator for the reaction by a persulfate, may be used, too.

The water-based dispersion of the invention must have the acid value (or resin acid value) in a range of 0 to 15. If the resin acid value is higher than 15, the film with lower alkaline resistance is formed. To adjust the resin acid value in a range of 0 to 15, for example, a monomer containing carboxyl group such as acrylic acid and methacrylic acid is blended at a rate of 0 to (15/581)M parts by weight to 100 parts by weight of the monomer, where M is the molecular weight of the monomer containing carboxyl group. The resin acid value is the number of milligrams of potassium hydroxide required to neutralize 1 g of water-based resin dispersion formed (solid content), and it is calculated in the following equation, for example, by sampling a small amount of the water-based resin dispersion into a glass beaker, weighing precisely it, and then, diluting it with a solvent (tetrahydrofuran; there is a case this is referred to as THF), and measuring the titration volume of 0.1N-potassium hydroxide aqueous solution until the point by means of potential differential titration apparatus.

Resin acid value =[0.1 (N)×titration amount of 0.1N-KOH aq. solution (ml)×56.1]/[sample weight (g)×(solid content of resin dispersion (non-volatile (NV) value)/100)].

The water-based resin dispersion obtained in the invention is outstandingly excellent in the solvent resistance after film formation. When the solubility in methyl ethyl ketone was compared by 5 minutes immersion test, for example, the resin film formed with a water-based resin dispersion of prior art was dissolved, while the resin film formed with the water-based resin dispersion of the invention was not dissolved.

The water-based resin dispersion and the resin composition for coating of the invention are applied, for example, on the surface of metals such as iron, zinc, and aluminum (including metal layer on base material such as zinc and aluminum plating on steel surface), and dried and baked, so that a film of high alkaline resistance is formed. The drying and baking conditions are not particularly specified as far as the coating object temperature reaches 80° to 100° C. For example, when heated in an electric drying oven for 8 seconds at 260° C., the coating object reaches 80° C. When a film is formed on the surface of a metal containing aluminum on the surface, such as aluminum-zinc alloy plated steel plate, by using the water-based resin dispersion and resin composition for coating of the invention, it is not darkened when contacted with alkaline solution such as cement and alkaline detergent. However, it is also possible to apply on the surface very small in aluminum content or completely free from it, and a film superior in alkaline resistance is formed.

The resin composition for coating of the invention contains the above water-based resin dispersion, and also contains, as required, one or more of alkaline, surface active agent, deionized water, hydrophilic solvent, chromium (VI) ions, thickener, wax, and others.

The alkaline is used for neutralization of emulsion resin, and contributes to stability of the product containing emulsion resin. When a solvent or chromic acid is abundantly mixed in the emulsion resin, it is thickened to form a gel-like material to produce "dimpled" product, but when neutralized, such phenomenon is prevented. Examples of alkaline include ammonia, triethylamine, and dimethyl ethanolamine, which may be used either alone or in combination of two or more.

The surface active agent is a different compound from the above, and is not reactive, and it keeps-wettability of the resin composition to the substrates, and is used so as to avoid defective appearances such as repelling and dent. For example, anionic surfactant and nonionic surfactant may be used. What is particularly preferred above all is the nonionic surfactant having a long-chain fluoride alkyl group in the molecule. It is because the wettability is maintained by a trace addition, so that the coating surface is uniformly wet with the water-based resin dispersion and resin composition for coating. The content of the surface active agent should be 0.05 wt. % or more as of solid to the resin solid, for example.

The deionized water (ion exchanged water) is added, if a smooth film is not obtained because of high viscosity of the water-based resin dispersion or resin composition for coating, and it is added, for example, by not more than 50 wt. % of the resin solid.

The hydrophilic solvent is considered to contribute greatly to the enhancement of fusibility of emulsion particles, and greatly improves the alkaline resistance of the formed film by blending into the resin composition. Examples of hydrophilic solvent include isopropyl alcohol (IPA), ethylene glycol monobutyl ether (butyl cellosolve), and diethylene glycol monobutyl ether (butylcarbitol). The blending ratio is 1 to 50 wt. %, for example, of the resin solid.

The chromium (VI) ion ($Cr^{6+}$) is effective to promote film formation by mutual action with the resin, as well as to suppress corrosion of aluminum. As to the chromium (VI), it is preferable to use chromic anhydride which does not contain either non-volatile alkaline components or ammonium salts that are likely to dissipate when forming a film. The content of chromium (VI) is, for example, 1/1000 to 1/10 (by weight) of the resin solid content (chromium (VI)/resin solid content). If added excessively, the stability is poor, when blending with the resin, and the resin may be formed into a gel. If insufficient, the desired alkaline resistance may not be expressed. When adding chromium (VI), it is recommended to store the solution containing the resin dispersion (solution A) and the solution containing chromium (VI) (solution B) separately, and mix the two solutions A and B just before application to form a resin composition as a coating material. This is because the desired performance is not obtained, if the both are in contact each other for a long period beforehand.

The thickener is used for adjusting the viscosity of the resin composition. It helps to keep the film appearance favorable. Example of thickener include water-soluble macromolecular cellulose and polyethylene oxide. The content of the thickener is in a range of 0.1 to 3 wt. %, for example, as of solid content of the resin solid.

As lubricity is required when processing the coated plate by roll forming or press forming, the wax is blended to provide lubricity. As the wax, for example, microwax is used, and its content is 0.2 to 3 wt. % as of solid content of the resin solid.

The timing of addition of chromium (VI) is as instructed above, but the other ingredients may be added anytime.

The method of applying the water-based resin dispersion and resin composition for coating of the invention is not particularly defined, and they may be applied in the same means and method of application of ordinary emulsion paint, such as roll coating, imersion coating, spray coating, brush coating, and electrostatic coating. Besides, the method of drying and curing is not particularly limited, and, for example, a method of heating at 100° to 260° C. for 8 seconds to 5 minutes may be employed. In this case, the reaching temperature of the coating object can be controlled under 100° C.

On each film formed by using the water-based resin dispersion and resin composition for coating of the invention, as required, ordinary middle coat or top coat may be applied, and the adhesion with the coat film formed on the upper side is also excellent.

Since the resin of the water-based resin dispersion of the invention is cross-linked by using a crosslinking $\alpha,\beta$-ethylenically unsaturated monomer, a tough film can be formed, as long as the film forming property is maintained, and the resistance to swelling and dissolution in alkaline water is also superior. Moreover, since $\beta$-ketoester group is contained, even if the acid value is lowered, the adhesion is not lowered by chelation with metal or hydrogen bond. For emulsion polymerization, an emulsifier is used,—and although an ordinary emulsifier moves into the gaps among resin particles and is concentrated at the time of forming film, the radically polymerizable reactive emulsifier is incorporated into the polymerization chain of the $\alpha,\beta$-ethylenically unsaturated monomer, so that such movement does not occur. Accordingly, it hardly affects adversely the alkaline resistance. The resin acid value of the resin dispersion is preferably lower, for the sake of—alkaline resistance, so as far not to impede the adhesion with the top coat.

The water-based resin dispersion and resin composition for coating of the invention respectively possess a film forming property, and are excellent in alkaline resistance, and are capable of forming a film having a favorable adhesion, so that the alkaline resistance will not be lowered by the emulsifier.

The resin composition for coating of the invention, containing chromium (VI) at the prescribed ratio, prevents corrosion of the substrate, promotes the film forming capability, and improves the alkaline resistance superbly.

When a film is formed on a metal surface by using the water-based resin dispersion and resin composition for coating of the invention, darkening due to alkaline solution hardly occurs, so that the uses may be extended in the fields of building materials and electrical appliances.

DESCRIPTION OF THE PREFERRED EMBODIMENTS

Practical embodiments of the invention and reference examples are illustrated herein, but it must be noted that the invention is not limited to these embodiments alone.

The aluminum-zinc alloyed steel panels used in the following embodiments and references are aluminum-zinc alloyed steel (Galvalume) with an alloy in the composition of 55 wt. % of Al, 43.4 wt. % of Zn, and 1.6 wt. % of Si (210 mm×300 mm×thickness 0.35 mm: plating weight 85 g/m2 on one side), which were cleaned in the vapor of trichloroethane for 60 seconds at 80° C.

First, the embodiments and references of the resin dispersion of the invention are described below.

Embodiment 1

In a three-liter flask furnished with agitator, condenser, two dropping funnels and thermometer, 0.5 g (1/10 of whole quantity) of nonionic-anionic reactive emulsifier (tradename Adecalia Soap SE-10N of Asahi Denka K.K.) and 700 g of deionized water were charged.

One dropping funnel was charged with a pre-emulsion prepared by agitating a mixture of 30 g of allyl acetoacetate, 10 g of ethylene glycol dimethacrylate, 200 g of styrene, 304 g of methyl methacrylate, 443 g of butyl acrylate, and 13 g of of acrylic acid, and an aqueous solution of 500 g of deionized water and 4.5 g of SE-10N (9/10 of whole quantity) by means of disper.

The other dropping funnel was charged with an aqueous solution of 3 g of almonium persulfate dissolved in 290 g of deionized water (polymerization initiator aqueous solution).

First, 1/10 of the whole quantity of pre-emulsion was poured in the flask, and heated to 80° C., and ⅓ of the whole quantity of polymerization initiator aqueous solution was charged, and the reaction was started. In 10 minutes after start of reaction, the remaining pre-emulsion was dropped, and dropping was terminated in 120 minutes. The remaining polymerization initiator aqueous solution was dropped in 120 minutes from 20 minutes after start of dropping of the pre-emulsion. After completion of dropping, agitation was continued for 120 minutes at 80° C. Thus was obtained an emulsion with 40 wt. % resin solid content dispersing resin in the water-based medium. This emulsion resin had the acid value of 11.9.

Embodiments 2 to 5 and References 1 to 8

The emulsion resins were obtained in the same manner as in Embodiment 1, except that the monomer and emulsifier were blended at the rates as shown in Tables 1 and 2.

In Tables 1, 2, SE-10N is the reactive emulsifier mentioned above, Eleminol JS-2 is an artionic reactive emulsifier (active ingredient 38 wt. %) manufactured by Sanyo Kasei Kogyo K.K.), RA-1022 is a nonionic-anionic reactive emulserfier prepared by Nihon Nyukazai K.K., and Aqualon HS-10 is a nonionic-anionic reactive emulsifier of Daiichi Kogyo Seiyaku K.K., and Eleminol MON-2 is an artionic emulsifier (without radical polymerization property) of Sanyo Kasai Kogyo K.K.

The Adecalia Soap SE-10N is a reactive emulsifier which is available from Asahi Denka Kabushiki Kaisha and which has the following structure:

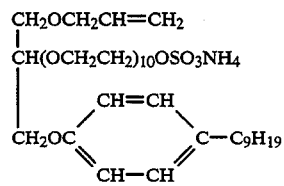

The Eleminol JS-2 is a reactive emulsifier which is available from Sanyo Kasei Kogyo Kabushiki Kaisha and which has a structure shown by the following formula:

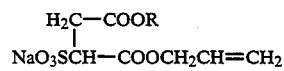

The RA-1022 is a reactive emulsifier which is available from Nippon Nyukazai Kabushiki Kaisha and has a structure shown by the following formula:

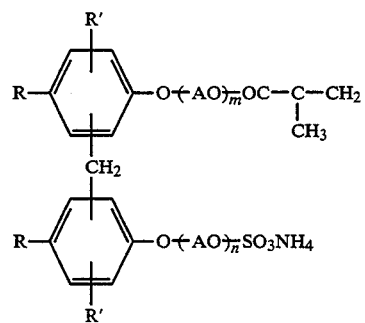

The Aqualon HS-10 is a polymerizable sulfuric acid ester type anionic surfactant which is available from Daiichi Kogyo Seiyaku Kabushiki Kaisha.

The Eleminol MON-2 is an anionic surfactant which is available from Sanyo Kasei Kogyo Kabushiki Kaisha and has a structure shown by the following formula:

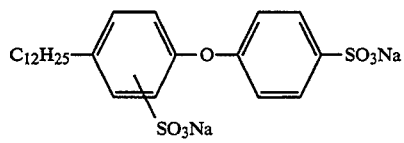

Tables 1, 2 also show the resin solid content of obtained emulsion resin, acid value, and solvent resistance after forming film. The acid value is the number of milligrams of potassium hydroxide required to neutralize 1 g of emulsion resin (water-based resin dispersion).

The solvent resistance after forming film was evaluated by adding 5% of butyl cellosolve to the resin dispersion solution, applying on a polypropyrene plate (PP plate) with a dried film thickness of 20 m by means of a doctor blade, drying for 5 minutes at 100° C. by a dryer, cutting out a free film of 10 mm×20 mm in size from the PP plate, immersing in the solvent, methyl ethyl ketone (MEK), at room temperature, and observing the residue of film 5 minutes later. The result was judged in the following standard.

O: Swollen but dissolution not recognized
Δ: Dissolved, but residue is found
x: Completely dissolved, with no residue coated panels reached 80° C. From the coated panels, test panels of 50 mm × 150 mm were cut off, and presented for alkaline resistance test.

In alkaline resistance test, after back-sealing the test pieces with polyester tape (the back was completely covered, but the cut section was exposed), the test

TABLE 1

|  |  | Embodiment 1 | Embodiment 2 | Embodiment 3 | Embodiment 4 | Embodiment 5 | Reference 1 | Reference 2 |
|---|---|---|---|---|---|---|---|---|
| Material blending of resin dispersion (parts by weight) | Allyl acetoacetate | 3 | — | 8 | — | — | 0.5 | — |
|  | AAEM | — | 5 | — | 10 | 15 | — | 25 |
|  | Ethylene glycol dimethacrylate | 1 | — | — | 0.5 | — | 1 | — |
|  | Divinyl benzene | — | 0.3 | — | — | 0.5 | — | 0.5 |
|  | Butyrene glycol dimethacrylate | — | — | 2 | — | — | — | — |
|  | Styrene | 20 | 20 | 20 | 20 | 20 | 20 | 20 |
|  | Methyl methacrylate | 30.4 | 33.9 | 25 | 25.4 | 21 | 31.7 | 15.8 |
|  | Butyl acrylate | 44.3 | — | — | 43.1 | 41.5 | 45.5 | 36.7 |
|  | 2-ethylhexyl acrylate | — | 39.6 | 44.2 | — | — | — | — |
|  | 2-Hydroxyethyl methacrylate | — | — | — | — | 2 | — | 2 |
|  | N-Methylol acrylamide | — | — | — | 0.5 | — | — | — |
|  | Acrylic acid | 1.3 | — | 0.8 | — | — | 1.3 | — |
|  | Methacrylic acid | — | 1.2 | — | 0.5 | — | — | — |
|  | Adecalia Soap SE-10N | 0.5 | — | 1 | — | — | 0.5 | — |
|  | Eleminol JS-2 | — | 0.38 | — | — | — | — | — |
|  | RA-1022 | — | — | — | 5 | — | — | — |
|  | Aqualon HS-10 | — | — | — | — | 2 | — | 2 |
|  | Eleminol MON-2 | — | — | — | — | — | — | — |
| Properties of resin dispersion | Resin solid content (wt. %) | 40 | 40 | 40 | 41 | 40 | 40 | 40 |
|  | Resin acid value | 11.9 | 9.6 | 8.0 | 5.1 | 1.8 | 11.9 | 1.8 |
|  | Film solvent resistance | o | o | o | o | o | o | o |

TABLE 2

|  |  | Reference 3 | Reference 4 | Reference 5 | Reference 6 | Reference 7 | Reference 8 |
|---|---|---|---|---|---|---|---|
| Material blending of resin dispersion (parts by weight) | Allyl acetoacetate | — | 8 | — | 3 | — | 3 |
|  | AAEM | 5 | — | 10 | — | — | — |
|  | Ethylene glycol dimethacrylate | — | — | 0.5 | 1 | — | 1 |
|  | Divinyl benzene | 0.05 | — | — | — | — | — |
|  | Butyrene glycol dimethacrylate | — | 7 | — | — | — | — |
|  | Styrene | 20 | 20 | 20 | 20 | 20 | 20 |
|  | Methyl methacrylate | 34.15 | 23 | 25.4 | 30.4 | 32.2 | 29.6 |
|  | Butyl acrylate | — | — | 43.1 | 44.3 | — | 44.3 |
|  | 2-ethylhexyl acrylate | 39.6 | 41.2 | — | — | 41.6 | — |
|  | 2-Hydroxyethyl methacrylate | — | — | — | — | — | — |
|  | N-Methylol acrylamide | — | — | 0.5 | — | — | — |
|  | Acrylic acid | — | 0.8 | — | 1.3 | — | 2.1 |
|  | Methacrylic acid | 1.2 | — | 0.5 | — | 6.2 | — |
|  | Adecalia Soap SE-10N | — | 1 | — | — | — | 0.5 |
|  | Eleminol JS-2 | 0.38 | — | — | — | — | — |
|  | RA-1022 | — | — | 15 | — | — | — |
|  | Aqualon HS-10 | — | — | — | — | — | — |
|  | Eleminol MON-2 | — | — | — | 0.5 | 1 | — |
| Properties of resin dispersion | Resin solid content (wt. %) | 40 | 40 | 43 | 40 | 40 | 40 |
|  | Resin acid value | 9.6 | 8.0 | 5.1 | 11.9 | 42.2 | 18.2 |
|  | Film solvent resistance | Δ | Not uniform film forming | o | o | x | o |

As shown in Tables 1 and 2, in all emulsion resins of the embodiments, films excellent in solvent resistance were formed. The emulsion resin of Reference 4 failed to form a film uniformly. This is regarded because the adhesion of the emulsion particles was poor.

Embodiments 6 to 10 and References 9 to 15

Using the emulsion resins obtained in Embodiments 1 to 5 and References 1 to 3, 5 to 8, 0.1% by weight of the fluorine surfactant (EFTOP EF122B of Mitsubishi Metal Co.) was added by 0.1 wt. % to the resin solid content, and the resin compositions were obtained.

The obtained resin compositions were applied on the aluminum-zinc alloyed steel panels by a dried coating weight of 3 g/m² by means of bar coater, and were immediately dried in an electric hot air drying oven for 8 seconds at 260° C. to form films, and coated panels were obtained. At this time, the temperature of the pieces were immersed in 1 wt. %-NaOH aqueous solution at 20° C., and held still without allowing the solution to flow, and were lifted 2 hours later and 5 hours later, and the color hue changes (degrees of darkening) before and after test were observed, and scored in 10-step rating. The criterion is as follows. The greater the score, the less is the hue change.

10 points Color difference (ΔL)=0
9 points Color difference (ΔL)=2
8 points Color difference (ΔL)=8
7 points Color difference (ΔL)=16
6 points Color difference (ΔL)=24
5 points Color difference (ΔL)=27
4 points Color difference (ΔL)=28
3 points Color difference (ΔL)=30
2 points Color difference (ΔL)=33
1 point Color difference (ΔL)=40

Using the obtained test panels, the adhesion with top coat was also tested. The top coat was cured in both air-drying and baking.

(Air-drying)

A short oil phthalic acid resin paint (tradename Unipack 100 of Nippon Paint Co.) was applied in a dry film thickness of 25 µm by means of bar coater, and dried at room temperature for 7 days to obtain coated panels.

(Baking)

A melamine-alkyd resin paint (Orga Select 200 of Nippon Paint Co.) was applied in a dry film thickness of 30 µm by bar coater, and baked at 110° C. for 20 minutes to obtain a coated plate.

The coated panels were cross-hatched with a knife to form 100 sections of squares at 1 mm intervals, and taped and then peeled off, and the number of remaining squares was counted. The results are shown in Tables 3, 4.

Embodiments 11 to 17, References 16 to 22

To the emulsion resins of the embodiments and references shown in Tables 5 and 6, the surface active agent (EF122B) was added by 0.1 wt. % of the resin solid content, and butyl cellosolve by 8 wt. % to the resin solid content, and were mixed by an agitator, and 8 wt. % of ammonium chromate aqueous solution was added so that the ratio by weight of Cr8+ may be as specified in Tables 5 and 6 to the resin solid content, thereby preparing resin compositions.

On the surface of aluminum-zinc alloyed steel panel, the resin composition was applied in a dry coating weight of 3 g/m² by means of bar coater. By immediately drying in the same manner as in Embodiments 6 to 10 and References 9 to 15, the coated panels were obtained, and test panels were cut off.

The obtained test panels were subjected for the same

TABLE 3

|  |  | Embodiment 6 | Embodiment 7 | Embodiment 8 | Embodiment 9 | Embodiment 10 | Reference 9 |
|---|---|---|---|---|---|---|---|
| Resin composition | Resin dispersion | Embodiment 1 | Embodiment 2 | Embodiment 3 | Embodiment 4 | Embodiment 5 | Reference 1 |
|  | Alkaline resistance of film | 2 hours immersion | 7 | 7 | 7 | 7 | 7 | 5 |
|  |  | 5 hours immersion | 4 | 5 | 5 | 5 | 5 | 3 |
| Adhesion with top coat | Air-dry 1 coat | $\frac{100}{100}$ | $\frac{100}{100}$ | $\frac{100}{100}$ | $\frac{100}{100}$ | $\frac{100}{100}$ | $\frac{42}{100}$ |
|  | Baking 1 coat | $\frac{100}{100}$ | $\frac{100}{100}$ | $\frac{100}{100}$ | $\frac{100}{100}$ | $\frac{100}{100}$ | $\frac{50}{100}$ |

TABLE 4

|  |  | Reference 10 | Reference 11 | Reference 12 | Reference 13 | Reference 14 | Reference 15 |
|---|---|---|---|---|---|---|---|
| Resin composition | Resin dispersion | Reference 2 | Reference 3 | Reference 5 | Reference 6 | Reference 7 | Reference 8 |
|  | Alkaline resistance of film | 2 hours immersion | 5 | 5 | 5 | 5 | 4 Delaminated | 5 |
|  |  | 5 hours immersion | 3 | 3 | 3 | 3 | 3 Delaminated | 3 |
| Adhesion with top coat | Air-dry 1 coat | $\frac{100}{100}$ | $\frac{100}{100}$ | $\frac{100}{100}$ | $\frac{100}{100}$ | $\frac{100}{100}$ | $\frac{100}{100}$ |
|  | Baking 1 coat | $\frac{100}{100}$ | $\frac{100}{100}$ | $\frac{100}{100}$ | $\frac{100}{100}$ | $\frac{100}{100}$ | $\frac{100}{100}$ |

As shown in Tables 3, 4, the resin compositions for coating in the embodiments formed films of higher alkaline resistance and better adhesion strength, as compared with the reference examples.

alkaline resistance test. The immersion time was 2 hours and 10 hours. The color changes (darkening) were observed in the same 10-step rating method. The results are shown in Tables 5 and 6.

Using the obtained test panels, the adhesion with top coat was tested same as above. The top coat was cured by both air-drying and baking.

The results are summarized in Tables 5 and 6.

TABLE 5

|  |  | Embodiment 11 | Embodiment 12 | Embodiment 13 | Embodiment 14 | Embodiment 15 | Embodiment 16 | Embodiment 17 |
|---|---|---|---|---|---|---|---|---|
| Properties of resin composition |  |  |  |  |  |  |  |  |
| Resin dispersion |  | Embodiment 1 | Embodiment 2 | Embodiment 3 | Embodiment 4 | Embodiment 5 | Embodiment 2 | Embodiment 4 |
| $\frac{Cr^{6+}}{\text{Resin solid content}}$ (ratio by weight) |  | $\frac{1}{100}$ | $\frac{1}{100}$ | $\frac{1}{100}$ | $\frac{1}{100}$ | $\frac{1}{100}$ | $\frac{1}{20}$ | $\frac{1}{800}$ |
| Alkaline resistance of film | 2 hours immersion | 9 | 9 | 9 | 9 | 9 | 9 | 8 |
|  | 10 hours immersion | 6 | 7 | 7 | 7 | 7 | 7 | 6 |

TABLE 5-continued

|  |  | Embodiment 11 | Embodiment 12 | Embodiment 13 | Embodiment 14 | Embodiment 15 | Embodiment 16 | Embodiment 17 |
|---|---|---|---|---|---|---|---|---|
| Adhesion with top coat | Air-drying 1 coat | 100/100 | 100/100 | 100/100 | 100/100 | 100/100 | 100/100 | 100/100 |
|  | Baking 1 coat | 100/100 | 100/100 | 100/100 | 100/100 | 100/100 | 100/100 | 100/100 |

TABLE 6

|  |  | Reference 16 | Reference 17 | Reference 18 | Reference 19 | Reference 20 | Reference 21 | Reference 22 |
|---|---|---|---|---|---|---|---|---|
| Properties of resin composition |  |  |  |  |  |  |  |  |
| Resin dispersion |  | Reference 1 | Reference 2 | Reference 3 | Reference 5 | Reference 6 | Embodiment 2 | Reference 8 |
| $\frac{Cr^{6+}}{\text{Resin solid content}}$ (ratio by weight) |  | $\frac{1}{100}$ | $\frac{1}{100}$ | $\frac{1}{100}$ | $\frac{1}{100}$ | $\frac{1}{100}$ | $\frac{1}{2000}$ | $\frac{1}{100}$ |
| Alkaline resistance of film | 2 hours immersion | 7 | 7 | 7 | 7 | 7 | 7 | 7 |
|  | 10 hours immersion | 4 | 3 | 3 | 3 | 4 | 2 | 3 |
| Adhesion with top coat | Air-drying 1 coat | 50/100 | 100/100 | 100/100 | 100/100 | 100/100 | 100/100 | 100/100 |
|  | Baking 1 coat | 70/100 | 100/100 | 100/100 | 100/100 | 100/100 | 100/100 | 100/100 |

As shown in Tables 5 and 6, the coated plates in the embodiments were superior in alkaline resistance as compared with the reference examples. What is more, the adhesion with top coat was also excellent.

What is claimed is:

1. A water-based resin dispersion having an acid value of 0 to 15, obtained by emulsion polymerization of a mixture of α,β-ethylenically unsaturated monomers, said mixture comprising, per 100 parts by weight of the α,β-ethylenically unsaturated monomer mixture,
   (1) 1 to 20 parts by weight of α,β-ethylenically unsaturated monomer having a β-ketoester group,
   (2) 0.05 to 5 parts by weight of crosslinking α,β-ethylenically unsaturated monomer having two or more groups polymerizable by radical polymerization, and
   (3) a balance of α,β-ethylenically unsaturated monomer other than monomers (1) and (2),
   said emulsion polymerization having been effected using a non-urethane-containing emulsifier which is polymerizable by radical polymerization, the emulsifier being used in an amount of 0.2 to 10 parts by weight per 100 parts by weight of the α,β-ethylenically unsaturated monomer mixture.

2. A water-based resin dispersion having an acid value of 0 to 15, obtained by emulsion polymerization of a mixture of α,β-ethylenically unsaturated monomers, said mixture comprising, per 100 parts by weight of the α,β-ethylenically unsaturated monomer mixture,
   (1) 3 to 15 parts by weight of α,β-ethylenically unsaturated monomer having a β-ketoester group,
   (2) 0.1 to 3 parts by weight of crosslinking α,β-ethylenically unsaturated monomer having two or more groups polymerizable by radical polymerization and
   (3) a balance of α,β-ethylenically unsaturated monomer other than monomers (1) and (2),
   said emulsion polymerization having been effected using a non-urethane-containing emulsifier which is polymerizable by radical polymerization, the emulsifier being used in an amount of 0.5 to 5 parts by weight per 100 parts by weight of the α,β-ethylenically unsaturated monomer mixture.

3. A resin composition for coating, comprising a water-based resin dispersion as claimed in claim 1.

4. A resin composition for coating as claimed in claim 3 further comprising chromium (VI) ions, the weight ratio of chromium (VI) ions to resin solid content being in the range of 1:1000 to 1:10.

5. A resin composition for coating, comprising a waterbased resin dispersion as claimed in claim 2.

6. A resin composition for coating as claimed in claim 5, further comprising chromium (VI) ions, the weight ratio of chromium (VI) ions to resin solid content being in the range of 1:1000 to 1:10.

7. A water-based resin dispersion as claimed in claim 1, wherein the mixture comprises 3 to 15 parts by weight of said α,β-ethylenically unsaturated monomer having a β-ketoester group.

8. A water-based resin dispersion as defined by claim 1 wherein the emulsifier contains a radically polymerizable group selected from the group consisting of an acrylic group, a methacrylic group, an allyl group, a methallyl group and a styryl group.

* * * * *